US009453743B2

(12) United States Patent
Lee et al.

(10) Patent No.: US 9,453,743 B2
(45) Date of Patent: Sep. 27, 2016

(54) DISTANCE MEASURING APPARATUS

(71) Applicant: HITACHI-LG DATA STORAGE KOREA, INC., Seoul (KR)

(72) Inventors: Wansoo Lee, Seoul (KR); Euncheol Lee, Seoul (KR); Taeksoo Lee, Seoul (KR)

(73) Assignee: HITACHI-LG DATA STORAGE KOREA, INC., Seoul (KR)

( * ) Notice: Subject to any disclaimer, the term of this patent is extended or adjusted under 35 U.S.C. 154(b) by 0 days.

(21) Appl. No.: 14/932,555

(22) Filed: Nov. 4, 2015

(65) Prior Publication Data

US 2016/0123764 A1    May 5, 2016

(30) Foreign Application Priority Data

Nov. 5, 2014    (KR) .................. 10-2014-0153103

(51) Int. Cl.
*G01C 25/00*    (2006.01)
*G01C 3/10*    (2006.01)

(52) U.S. Cl.
CPC ............... *G01C 25/005* (2013.01); *G01C 3/10* (2013.01)

(58) Field of Classification Search
CPC ............................. G01C 25/005; G01C 3/10
See application file for complete search history.

(56) References Cited

U.S. PATENT DOCUMENTS

| 2004/0186676 A1* | 9/2004 | Liu ................. G01C 25/005 702/92 |
| 2009/0147239 A1* | 6/2009 | Zhu ..................... G01S 7/285 356/3.12 |
| 2012/0094401 A1* | 4/2012 | Markwort ......... G01N 21/9501 438/8 |
| 2013/0294692 A1* | 11/2013 | Koziarz ................... G06T 9/00 382/173 |
| 2014/0055560 A1* | 2/2014 | Fu ..................... H04N 13/0022 348/42 |

* cited by examiner

*Primary Examiner* — Kara E Geisel
*Assistant Examiner* — Hina F Ayub
(74) *Attorney, Agent, or Firm* — Birch, Stewart, Kolasch & Birch, LLP

(57) ABSTRACT

Disclosed herein is a distance measuring apparatus. The distance measuring apparatus includes a light-emitting unit configured to radiate light in a pulse form of a specific width, a light-receiving unit configured to include a plurality of cells for receiving reflected light radiated by the light-emitting unit and reflected by an object, and a processor configured to perform one or more of an operation for calculating a first distance of the object using a first method based on the locations of one or more cells which belong to the plurality of cells and on which the reflected light is focused and an operation for calculating a second distance of the object using a second method based on the time when the reflected light is reached and to correct the first distance calculated using the first method based on the second distance calculated using the second method.

8 Claims, 3 Drawing Sheets

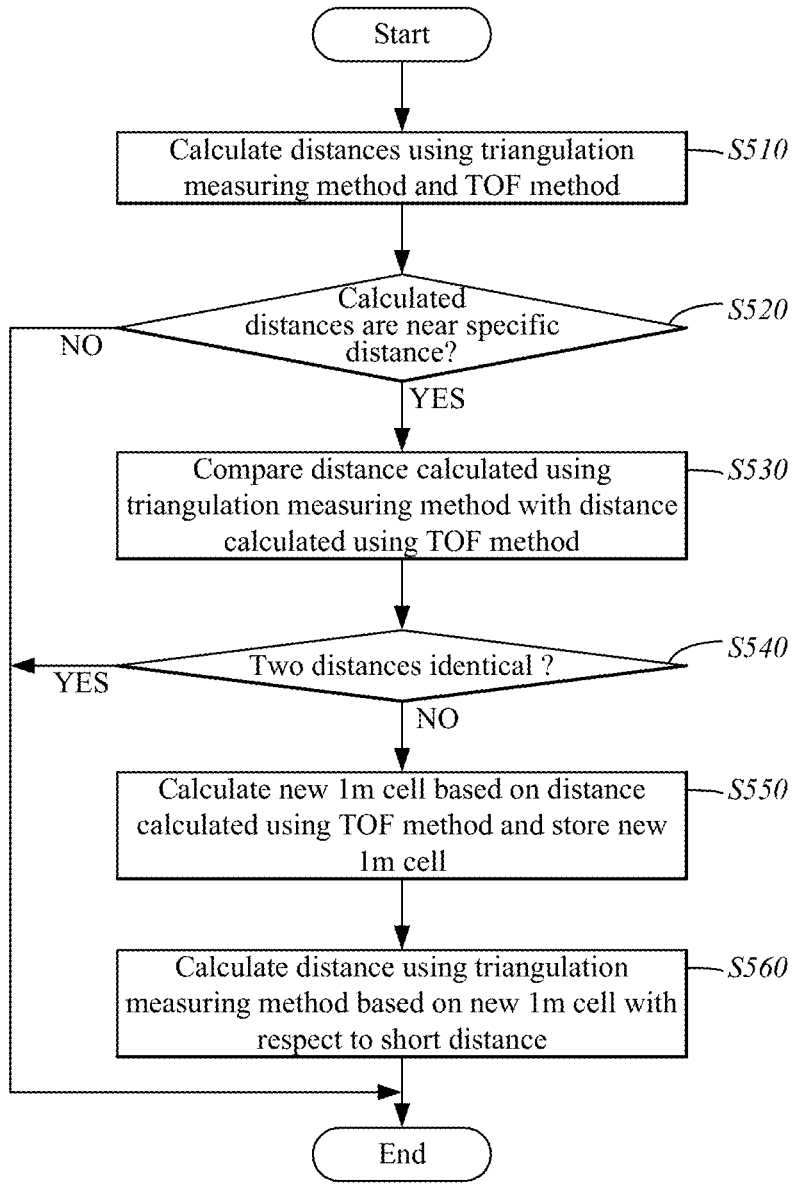

DISTANCE MEASURING APPARATUS

CROSS-REFERENCE TO RELATED APPLICATION

Pursuant to 35 U.S.C. §119(a), this application claims the benefit of earlier filing date and right of priority to Korean Patent Application No. 10-2014-0153103, filed on Nov. 5, 2014, the contents of which are incorporated by reference herein in their entirety.

BACKGROUND OF THE INVENTION

1. Field of the Invention

The present invention relates to a distance measuring apparatus and, more particularly, to a distance measuring apparatus for compensating for an error of the distance measured by a triangulation measuring method in accordance with a TOF method.

2. Discussion of the Related Art

A sensor for measuring the distance includes an infrared sensor using infrared rays, an ultrasonic sensor using ultrasonic waves, and a TOF sensor. The infrared sensor may receive focusing light of infrared rays, which is radiated by a light source and then reflected by a surface of the object to be measured, in accordance with a triangulation measuring principle and may measure the distance using a position sensitive detector (PSD) capable of calculating a light-receiving point as an output current. The ultrasonic sensor may measure the distance from the object to be measured by measuring the time that is taken for an ultrasonic wave pulse generated by a sensor to be reflected by a surface of the object to be measured and to then return back to the sensor.

A TOF sensor includes a light source, such as an LED for emitting an infrared pulse of a very short width, and a sensor for detecting light reflected by the object. The distance from the object may be calculated using an equation $d = c \cdot t_{TOF}/2$ (d is the distance from the object, c is speed of light, and $t_{TOF}$ is the time taken for light radiated by the light source to be reflected by the object and to then return back to the sensor) by measuring the time that is taken for light radiated by the light source to be reflected by the object and to then return back to the sensor. Since speed of light is too fast and thus it is difficult to measure the time $t_{TOF}$, the distance is indirectly calculated by modulating and radiating light through the light source and using two or more phases.

FIG. 1 shows the principle in which the distance is measured in accordance with a TOF method.

When a light source radiates light in a pulse form of a specific width T0, light reflected by the object reaches a sensor after a lapse of a specific time Td. The sensor detects the reflected light in synchronization with the pulse emitted by the light source (phase 1) and also detects the reflected light with a phase difference of 180 degrees from the pulse emitted by the light source (phase 2). The sensor may calculate the distance from the object based on the amount of light Q1 detected in synchronization with the output light and the amount of light Q2 having the phase difference of 180 degrees from the output light.

A cell forming the sensor may include two switches V1 and V2, two capacitors C1 and C2, and a diode D for generating charges in response to reflected light. The switches S1 and S2 operate in response to the phase 1 and the phase 2, respectively, and alternately connect the diode D for generating charges in response to reflected light to the capacitors C1 and C2. Charges generated from the diode D are stored in the capacitors C1 and C2 as the amounts of charges Q1 and Q2. Accordingly, the voltages V1 and V2 of the capacitors C1 and C2 are proportional to the amounts of charges Q1 and Q2 accumulated in the capacitors C1 and C2. In this case, the distance from the object may be calculated as a value proportional to $$(1/2) \cdot c \cdot T0 \cdot V2/(V1+V2)$$

A distance measuring unit for measuring the distance using the TOF method may be problematic in that a cell forming a sensor is saturated when measuring a short distance and may be problematic in that the amount of light is insufficient when measuring a long distance.

There is an attempt to solve the cell saturation problem in a short distance in measuring the distance using the TOF method by adopting a triangulation measuring method for calculating the distance from the object using a sensor including a plurality of cells in which TOF distance measuring units are aligned in one direction.

In such a triangulation measuring method, however, after a calibration operation is initially performed on the relationship between the distance and the cell, a distance characteristic of the sensor may be changed due to the lapse of time, an external impact, and a change of an environment. Although there is an error in a measured distance, it is difficult to check the error, and there is no method for compensating for the error. In order to solve an error problem, a distance meter must be repaired by an expert.

SUMMARY OF THE INVENTION

Accordingly, the present invention has been made keeping in mind the above problems occurring in the prior art, and an object of the present invention is to provide a distance measuring apparatus capable of compensating for a measurement error when measuring a short distance using a triangulation measuring method.

A distance measuring apparatus according to an embodiment of the present invention is configured to include a light-emitting unit configured to radiate light in a pulse form of a specific width, a light-receiving unit configured to include a plurality of cells for receiving reflected light radiated by the light-emitting unit and reflected by an object, and a processor configured to perform one or more of an operation for calculating a first distance of the object using a first method based on the locations of one or more cells which belong to the plurality of cells and on which the reflected light is focused and an operation for calculating a second distance of the object using a second method based on the time when the reflected light is reached and to correct the first distance calculated using the first method based on the second distance calculated using the second method.

In an embodiment, the distance measuring apparatus may be configured to further include memory configured to store a reference value for calculating the first distance using the first method.

In an embodiment, the processor may update the reference value stored in the memory based on the second distance calculated using the second method.

In an embodiment, the reference value may be indicative of one of the one or more cells on which the reflected light is focused when the object is a specific distance.

In an embodiment, the reference value may be represented as a rational number so that the reference value is indicative of the center of the reflected light focused on the one or more cells.

In an embodiment, the processor may correct the first distance calculated using the first method based on the second distance measured to be a specific value or less using the second method.

In an embodiment, the processor may correct the first distance calculated using the first method based on the second distance calculated using the second method when the reflected light is detected in the first cell section of the plurality of cells and may select the corrected first distance as a distance from the object.

In an embodiment, the processor may select the second distance calculated using the second method as a distance from the object when the reflected light is detected in the second cell section of the plurality of cells other than the first cell section.

In an embodiment, the processor may do not perform the operation for calculating the first distance using the first method and may perform the operation for calculating the second distance the second method when the reflected light is detected in the second cell section of the plurality of cells.

BRIEF DESCRIPTION OF THE DRAWINGS

FIG. 5 is a flowchart illustrating an operation for compensating for a distance error in accordance with an embodiment of the present invention.

DETAILED DESCRIPTION OF THE EMBODIMENTS

Figure 1:
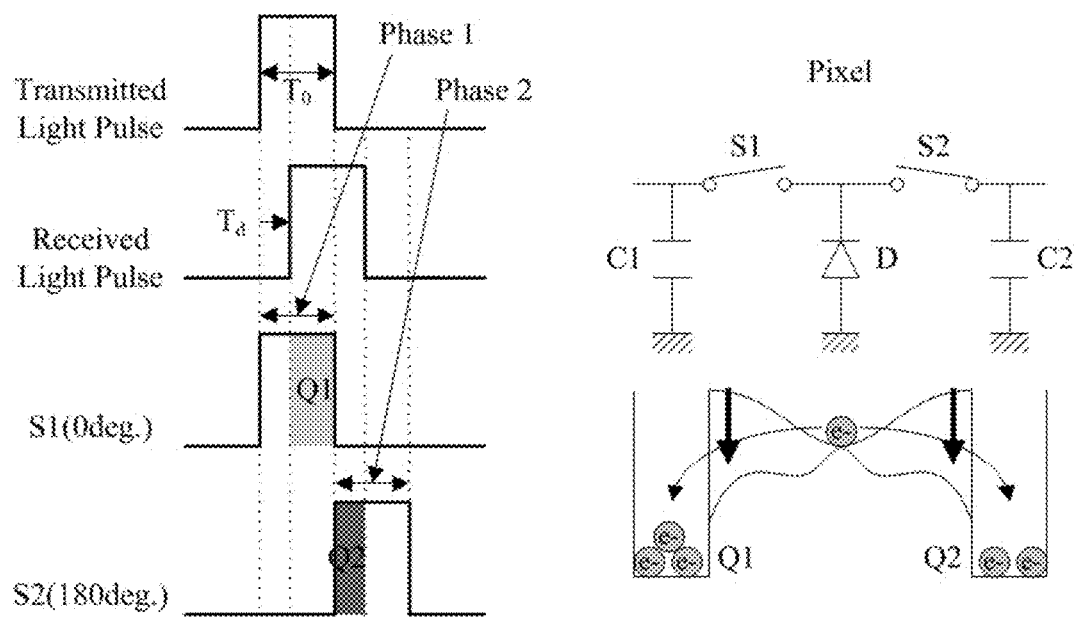
FIG. 1 shows the principle in which the distance is measured in accordance with a TOF method.

Hereinafter, a distance measuring apparatus according to an embodiment of the present invention is described in detail with reference to the accompanying drawings.

In the triangulation measuring method, a corresponding relation between the distance and a plurality of cells forming a sensor is not constant due to the electrical characteristics and control characteristics of the sensor and the characteristics of an optical lens ahead of a light source and the sensor. Accordingly, two or more points whose distances are known may be selected by taking into consideration the characteristics of the sensor, and distance measurement may be calibrated using a cell to which light has been reached with respect to one of the corresponding points.

After such initial calibration is completed, however, the characteristic of a measured distance may be changed because the location of a cell of reflected light focused on the sensor may be changed due to a natural change according to the lapse of time, an external impact, and/or a change of an environment. There is no method for compensating for such a distance error. Furthermore, although a distance error is increased over time, it is difficult to check whether the distance error occurs, and a method of correcting the distance error is also complicated.

In an embodiment of the present invention, an error of distance measurement generated due to a change of the characteristics of a sensor module using the triangulation measuring method over time is compensated for.

There is no method of detecting a change of the characteristics of the sensor although the characteristics of the sensor are changed because the sensor itself is a passive element. That is, to measure a clear specific distance and check whether a calculated value is different is a sole method of detecting a change of the characteristics.

The calibration of a specific distance is once performed only before or when a distance measuring apparatus is released or evaluated and is rarely performed after the distance measuring apparatus is released. Accordingly, there is no change of correcting performance of the distance measuring apparatus after it is released.

Accordingly, in an embodiment of the present invention, a sensor including a plurality of cells is mounted on a distance measuring apparatus using a TOF method so that the distance measuring apparatus is capable of using a triangulation measuring method, and the location of a cell on which reflected light is focused is managed with respect to a specific distance by supplementing the data of the TOF method and the triangulation measuring method. Disadvantages of the TOF method are supplemented by measuring a short distance using the triangulation measuring method and an error component generated in the triangulation measuring method over time is compensated for using the TOF method, thereby being capable of measuring the distance uniformly and precisely.

The TOF method is not greatly influenced by the physical location or a change of the characteristics of the sensor in the distance measuring apparatus because the time taken for reflected light to be reached is measured. Accordingly, there is a good possibility that an error may not occur compared to the triangulation measuring method in measuring the distance using the TOF method although time elapses.

Figure 2:
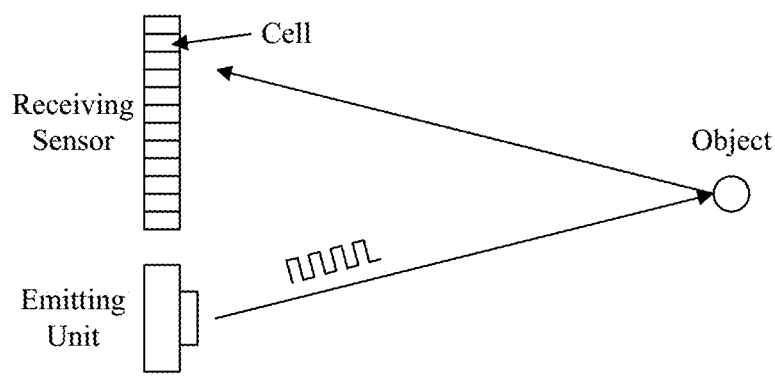
FIG. 2 schematically shows the configuration of a distance measuring apparatus including a sensor having a plurality of cells using a TOF method in order to use a triangulation measuring method.

FIG. 2 schematically shows the configuration of a distance measuring apparatus including a sensor having a plurality of cells using a TOF method in order to use a triangulation measuring method.

A distance measuring apparatus for measuring the distance using the TOF method is unable to precisely measure the distance because the sensor is saturated due to light reflected by the object when measuring a short distance. Accordingly, as shown in FIG. 2, the distance measuring apparatus may measure the distance in accordance with the triangulation measuring method based on the location of a cell that belongs to the plurality of cells and on which reflected light is focused with respect to a short distance and may use the TOF method using time when the reflected light is detected with respect to a long distance, using the sensor in which the plurality of cells are aligned in the direction extended from a light-emitting unit.

Figure 3:
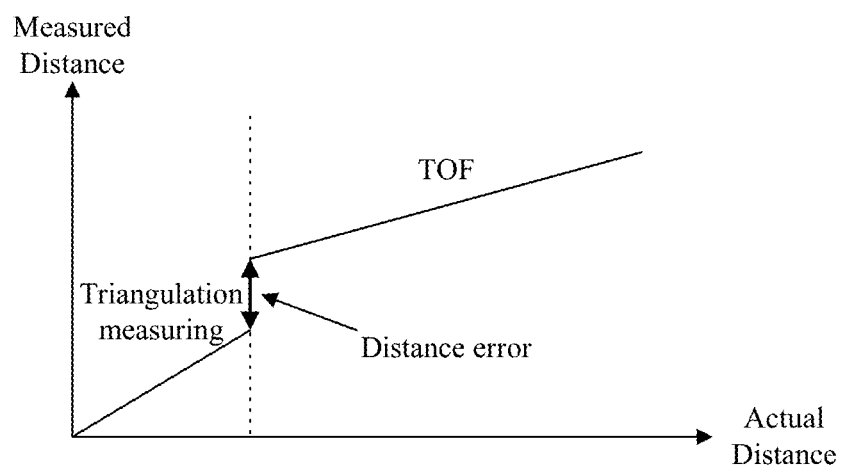
FIG. 3 is a graph showing that a distance error is generated due to a specific distance, that is, a boundary, in a TOF distance measuring unit of FIG. 2.

As described above, when the distance is measured using a mixture of the triangulation measuring method having an advantage of a short distance and the TOF method having an advantage of a long distance, there is a difference in the calculation of the distances using the triangulation measuring method and the TOF method with respect to a point corresponding to the boundary of the short distance and the long distance over time, that is, for example, 1 m. Accordingly, as shown in FIG. 3, a discontinuous point may occur at the boundary of the short distance and the long distance. It is necessary to control lines on both sides of the boundary so that the lines are continuous.

In an embodiment of the present invention, in order to apply the triangulation measuring method, when reflected light is incident from the object in a specific distance, for example, 1 m to the sensor, a cell in which the center of the reflected light is placed is stored. When the distance is measured using the TOF method with respect to the object at a distance of 1 m, the gain or offset of a TOF distance calculation algorithm is set and stored so that the actual distance of 1 m is calculated. The stored value may be subsequently used when the distance is calculated using the triangulation measuring method or the TOF method.

Furthermore, when a specific distance, for example, the distance from the object placed around 1 m is measured, the distance calculated using the triangulation measuring method may be compared with the distance calculated using the TOF method. The location of a cell on which light reflected by the object in a specific distance is focused for the triangulation measuring method may be updated based on the distance using the TOF method. The triangulation measuring method may be applied based on information about the updated location of the cell.

Figure 4:
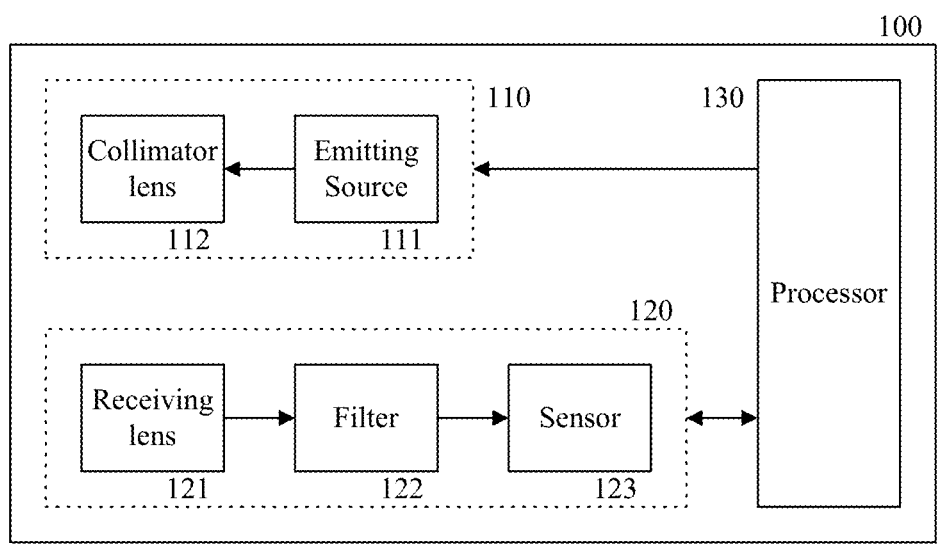
FIG. 4 shows the configuration of a distance measuring apparatus to which an embodiment of the present invention is applied.

FIG. 4 shows the configuration of a distance measuring apparatus to which an embodiment of the present invention is applied.

The distance measuring apparatus 100 according to an embodiment of the present invention may be configured to include a light-emitting unit 110 configured to emitting an infrared pulse of a specific width in order to measure the distance from the object using the TOF method, a light-receiving unit 120 configured to detect reflected light of infrared rays that are radiated by the light-emitting unit 110 and then reflected by the object, and a processor 130 configured to calculate the distance from the object using one or more of the triangulation measuring method and the TOF method based on the output signal of the light-receiving unit 120.

The light-emitting unit 110 may be configured to include a light-emitting source 111 configured to include a light-emitting module, such as an LED for radiating infrared rays, and a driving unit for driving the light-emitting module so that it outputs light in the form of a pulse having a specific width and an optical system configured to control an angle of light or the intensity of light to be radiated the front surface of the light-emitting source 111, for example, a collimator lens 112.

The light-receiving unit 120 may be configured to include a light-receiving lens 121 configured to convert an incident beam in a specific size and shape, such as a telecentric lens, a filter 122 configured to selectively transmit only a wavelength band of light radiated by the light-emitting source 111, and a light-receiving sensor 123 configured to have a plurality of cells aligned therein in one direction in order to detect reflected light.

Each of the cells of the light-receiving sensor 123 includes a circuit element, such as that shown in FIG. 1, so that the circuit element is able to measure the distance using the TOF method. Accordingly, the cell may receive reflected light in synchronization with an infrared pulse emitted by the light-emitting source 111 (phase 1), may receive the reflected light with a phase difference of 180 degrees from the infrared pulse emitted by the light-emitting source 111 (phase 2), and may generate the electrical signal of the phase 1 and the electrical signal of the phase 2.

The processor 130 may calculate the distance from the object from which output light is reflected using the electrical signals received from cells of the light-receiving sensor 123. The processor 130 may check a cell in which the center point of focused reflected light is placed using a distribution of the cells (i.e., the intensities of the electrical signals and the section of the cells generating the electrical signals) outputting the electrical signals indicating that the reflected light is focused and may calculate the distance when the reflected light is focused on the corresponding cell in accordance with the triangulation measuring method.

Furthermore, the processor 130 may calculate the distance from the object by calculating the time that is taken for the output light to be focused on the light-receiving sensor 123 as the reflected light in accordance with the TOF method based on the electrical signals of the phase 1 generated by the cells of the light-receiving sensor 123 and the electrical signals of the phase 2.

The distance measuring apparatus 100 according to an embodiment of the present invention may initially store a reference value, obtained by performing calibration on the object in a specific distance, for example, 1 m, in memory (not shown) and subsequently calculate the distance from the object based on the reference value. The reference value may be indicative of one of one or more cells on which reflected light reflected by the object in a reference distance to be used in the triangulation measuring method, for example, in a distance of 1 m is focused.

The central location of reflected light focused on a plurality of the cells may become the center of the cell or the boundary between the cells. In some embodiments, a specific point on the cell may be determined as the central location of the reflected light focused on the plurality of cells by calculating the highest location in a distribution of the intensities of electrical signals generated by the cells of the light-receiving sensor 123 in response to the reflected light. In this case, if the center of each cell or the boundary between the cells is represented as an integer, the reference value may be represented as a rational number.

The memory may further store gain values and/or offset values required when the distance is calculated using the TOF method, that is, when the electrical signals of the phase 1 and the electrical signals of the phase 2 generated by the cells of the light-receiving sensor 123 are calculated.

The processor 130 may calculate the distance using the TOF method with respect to all the electrical signals generated by the cells of the light-receiving sensor 123. In some embodiments, the processor 130 may calculate the distance using the TOF method with respect to only electrical signals generated by some cells, for example, only an electrical signal generated by a cell having the strongest electrical signal intensity or electrical signals generated by cells around a corresponding cell including the electrical signal of the corresponding cell.

Furthermore, the processor 130 may calculate the distance using the triangulation measuring method whenever the cells of the light-receiving sensor 123 generate electrical signals. In some embodiments, the processor 130 may calculate the distance using the triangulation measuring method only when an electrical signal is output in some cell section of the plurality of cells of the light-receiving sensor 123.

The plurality of cells included in the light-receiving sensor 123 is aligned in the direction extended from the light-emitting source 111. Reflected light reflected by a close object is focused on a cell far from the light-emitting source 111, and reflected light reflected by a distant object is focused on a cell close to the light-emitting source 111.

In an embodiment of the present invention, a short distance is measured using the triangulation measuring method, and a long distance is measured using the TOF method. Accordingly, for example, when a cell far from the light-emitting source 111 generates an electrical signal, the processor 130 calculates the distance using the triangulation measuring method, but may compensate for a distance error generated in the triangulation measuring method using a value calculated using the TOF method with respect to the object in a specific distance, for example, in a distance of 1 m. For example, when a cell close to the light-emitting source 111 generates an electrical signal, the process or 130 may calculate the distance using the TOF method without performing an operation for calculating the distance using the triangulation measuring method.

The distance measuring apparatus according to an embodiment of the present invention may be applied to an electronic device which autonomously operates indoors, for example, a robot cleaner. The distance measuring apparatus may be designed to measure a range of 5 m, for example, because the interior has a limited space. In this case, a distance of 0~1 m may be calculated in accordance with the triangulation measuring method and a distance of more than 1 m may be calculated in accordance with the TOF method using 1 m, for example, as a boundary. The location or angle of the light-receiving sensor 123 or power of the light-receiving lens 121 may be controlled so that a distance range to be measured by the distance measuring apparatus corresponds to some cell section of the light-receiving sensor 123.

If the distance measuring apparatus according to an embodiment of the present invention is adopted in a robot cleaner, timing when the robot cleaner is placed in a specific distance of a wall or the object, for example, in a distance of 1 m while the robot cleaner moves may be frequently generated. In this case, the distance measuring apparatus may compare a distance calculated using the TOF method with a distance calculated using the triangulation measuring method on corresponding timing and may compensate for the distance calculated using the triangulation measuring method based on the distance calculated using the TOF method. Furthermore, a reference value when the distance is calculated using the triangulation measuring method, for example, the location value of a cell corresponding to a distance of 1 m, may be updated based on a distance calculated using the TOF method.

FIG. 5 is a flowchart illustrating an operation for compensating for a distance error in accordance with an embodiment of the present invention.

In an initial calibration process, the processor 130 checks the location of a cell corresponding to a maximum point or center point of reflected light reflected by the object in a specific point, for example, in a distance of 1 m based on an electrical signal generated by the light-receiving sensor 123 and stores information about the location of the cell in the memory as a reference value for the triangulation measuring method. If an optical design is taken into consideration, the reflected light is focused within a specific cell section with respect to the point of 1 m.

When an electrical signal is detected in the corresponding cell section, the processor 130 may determine that the electrical signal corresponds to a short distance, may select a distance calculated using the triangulation measuring method based on the reference value stored in the memory, and may output the selected distance. When an electrical signal is detected in another cell section, the processor 130 may determine that the electrical signal corresponds to a long distance, may calculate the distance using the TOF method, and may output the calculated distance.

The processor 130 of the distance measuring apparatus 100 on which a robot cleaner that autonomously operates, for example, has been mounted measures the distance using the triangulation measuring method and/or the TOF method in response to an electrical signal generated by the light-receiving sensor 123 at step S510. The processor 130 selects and outputs the distance calculated using the triangulation measuring method with respect to a specific distance and calculates and outputs the distance using the TOF method with respect to a long distance on the basis of 1 m, for example.

The processor 130 determines whether the distance calculated using the triangulation measuring method and/or the TOF method is a specific distance, for example, around 1 m at step S520.

If, as a result of the determination at step S520, it is determined that the distance calculated using the triangulation measuring method and/or the TOF method is around 1 m (YES), the processor 130 compares the distance calculated using the triangulation measuring method with the distance calculated using the TOF method at step S530.

If, as a result of the comparison, it is found that the distance calculated using the triangulation measuring method is not identical with the distance calculated using the TOF method (NO at step S540), the processor 130 determines that an error has occurred in the distance calculated using the triangulation measuring method because the physical location or characteristics of one or more of the light-receiving lens 121 and light-receiving sensor 123 of the light-receiving unit 120 have been changed or the physical location or angle of the light-emitting unit 110 and the light-receiving unit 120 has been changed. Accordingly, the processor 130 newly calculates a reference value for a 1 m cell when calculating the distance using the triangulation measuring method, based on the distance calculated using the TOF method, and updates and stores the newly calculated reference value in the memory at step S550.

The processor 130 may change the reference value for the 1 m cell based on only the distance calculated using the TOF method. In some embodiments, the processor 130 may change the reference value for the 1 m cell by equally incorporating the distance calculated using the TOF method and the distance calculated using the triangulation measuring method.

Furthermore, the processor 130 may store the newly calculated reference value in the memory by incorporating the reference value as the reference value for the 1 m cell without a change. In some embodiments, the processor 130 may update the reference value for a 1 m cell with a middle value of a new value and a value previously stored in the memory in the same portion by taking stability into consideration.

Thereafter, if it is determined that an electrical signal generated by the light-receiving sensor 123 is detected in a cell section corresponding to a short distance, the processor 130 may calculate the distance using the triangulation measuring method based on the new reference value for a 1 m cell and output the calculated distance at step S560.

The operation for updating the reference value for a 1 m cell may be performed in real time while the distance measuring apparatus operates. While the distance measuring apparatus operates, a more accurate distance corrected in real time in response to a change of an environment, such as a temperature rise, may be measured.

In some embodiments, while the distance measuring apparatus operates, only an error between a newly calculated reference value and a previous reference value stored in the memory may be accumulated and calculated. At a specific point of time, for example, when the distance measuring apparatus is powered off, a reference value may be updated with the accumulated value and stored in the memory.

Accordingly, a saturation problem occurring when a distance measuring device measures a short distance using the TOF method can be solved.

Furthermore, a distance measurement error occurring when the object in a short distance is measured using the triangulation measuring method can be compensated for.

Furthermore, a distance error occurring over time in the triangulation measuring method can be compensated for, and a distance error attributable to change of an environment, such as a high temperature or low temperature, can be compensated for.

Furthermore, measurement in a short distance can be calibrated in real time.

As described above, the embodiments of the present invention have been disclosed for illustrative purposes, and those skilled in the art may improve, change, replace, or add various other embodiments without departing from the technical spirit and scope of the present invention disclosed in the attached claims.

What is claimed is:

1. A distance measuring apparatus, comprising:
a light-emitting unit configured to radiate light in a pulse form of a specific width;
a light-receiving unit configured to comprise a plurality of cells for receiving reflected light radiated by the light-emitting unit and reflected by an object; and
a processor configured to perform one or more of an operation for calculating a first distance of the object using a first method based on locations of one or more cells which belong to the plurality of cells and on which the reflected light is focused and an operation for calculating a second distance of the object using a second method based on a time when the reflected light is reached and to correct the first distance calculated using the first method based on the second distance calculated using the second method,
wherein the processor corrects the first distance calculated using the first method based on the second distance measured to be a specific value or less using the second method.

2. The distance measuring apparatus of claim 1, further comprising memory configured to store a reference value for calculating the first distance using the first method.

3. The distance measuring apparatus of claim 2, wherein the processor updates the reference value stored in the memory based on the second distance calculated using the second method.

4. The distance measuring apparatus of claim 2, wherein the reference value is indicative of one of the one or more cells on which the reflected light is focused when the object is a specific distance.

5. The distance measuring apparatus of claim 4, wherein the reference value is represented as a rational number so that the reference value is indicative of a center of the reflected light focused on the one or more cells.

6. The distance measuring apparatus of claim 1, wherein the processor corrects the first distance calculated using the first method based on the second distance calculated using the second method when the reflected light is detected in a first cell section of the plurality of cells and selects the corrected first distance as a distance from the object.

7. The distance measuring apparatus of claim 6, wherein the processor selects the second distance calculated using the second method as a distance from the object when the reflected light is detected in a second cell section of the plurality of cells other than the first cell section.

8. The distance measuring apparatus of claim 7, wherein the processor does not perform the operation for calculating the first distance using the first method and performs the operation for calculating the second distance the second method when the reflected light is detected in the second cell section of the plurality of cells.

* * * * *